US011501267B2

(12) United States Patent
Crowley et al.

(10) Patent No.: US 11,501,267 B2
(45) Date of Patent: Nov. 15, 2022

(54) SYSTEM AND METHOD FOR IMPLEMENTING FAST PAYOUTS

(71) Applicant: PayPal, Inc., San Jose, CA (US)

(72) Inventors: William Earl Crowley, Vancouver (CA); Michael Ting, San Carlos, CA (US); David Koch, Vancouver (CA)

(73) Assignee: PayPal, Inc., San Jose, CA (US)

( * ) Notice: Subject to any disclaimer, the term of this patent is extended or adjusted under 35 U.S.C. 154(b) by 327 days.

(21) Appl. No.: 16/533,424

(22) Filed: Aug. 6, 2019

(65) Prior Publication Data

US 2021/0042712 A1    Feb. 11, 2021

(51) Int. Cl.
*G06Q 20/02*    (2012.01)
*G06Q 20/40*    (2012.01)
*G06Q 20/38*    (2012.01)

(52) U.S. Cl.
CPC ......... *G06Q 20/027* (2013.01); *G06Q 20/381* (2013.01); *G06Q 20/405* (2013.01); *G06Q 20/4016* (2013.01)

(58) Field of Classification Search
CPC .................................................... G06Q 20/027
See application file for complete search history.

(56) References Cited

U.S. PATENT DOCUMENTS

| | | | | |
|---|---|---|---|---|
| 9,898,717 B2 * | 2/2018 | Goeppinger | ....... | G06Q 10/1095 |
| 2003/0036996 A1 * | 2/2003 | Lazerson | ............... | G06Q 40/08 |
| | | | | 705/38 |
| 2011/0246358 A1 * | 10/2011 | Blackhurst | ............. | G06Q 20/10 |
| | | | | 705/39 |
| 2014/0143147 A1 * | 5/2014 | Poornachandran | .... | G06Q 20/10 |
| | | | | 705/44 |
| 2014/0156435 A1 * | 6/2014 | Rahman | ............... | G06Q 20/385 |
| | | | | 705/44 |
| 2014/0172695 A1 * | 6/2014 | Kanjlia | ............... | G06Q 20/4014 |
| | | | | 705/39 |
| 2016/0071083 A1 * | 3/2016 | Apps | .................... | G06Q 20/027 |
| | | | | 705/44 |
| 2017/0004501 A1 * | 1/2017 | Ledford | ............. | G06Q 20/4016 |
| 2020/0019960 A1 * | 1/2020 | Crowley | ............... | G06Q 20/385 |
| 2020/0349639 A1 * | 11/2020 | Mousseau | .............. | G06Q 20/04 |
| 2020/0351089 A1 * | 11/2020 | Wentz | .................. | G06Q 20/401 |

FOREIGN PATENT DOCUMENTS

WO    WO-2016097674 A1 *    6/2016    ........... G06F 9/5027

OTHER PUBLICATIONS

"Labrou et al., Wireless Wallet, Sep. 3, 2004, IEEE Xplore, entire document" (Year: 2004).*

* cited by examiner

*Primary Examiner* — Hani M Kazimi
*Assistant Examiner* — Adam Hilmantel

(57) ABSTRACT

A system and method for implementing a fast payment is described. A request to execute a payout to a payee account is received, where the request includes information about the payout. At least one payment rail available for the requested payout is determined from a plurality of payment rails based on the included information. Rules associated with each of the at least one payment rail are identified. A fastest payment rail is determined from the at least one payment rail for executing the payout based on the identified rules and the information about the payout. The payout is then executed over the determined fastest payment rail.

20 Claims, 4 Drawing Sheets

SYSTEM AND METHOD FOR IMPLEMENTING FAST PAYOUTS

TECHNICAL FIELD

The subject technology generally relates to payouts and more particularly, relates to a system and method for implementing faster payouts to a payee.

BACKGROUND

As the pace at which ecommerce is conducted continues to quicken, the demand for quicker payment settlements has likewise grown. Companies such as Amazon continue to push the envelope of faster deliveries, to the point where shipments can be received before payments are even settled. Such latency in the payment process can pose problems for smaller merchants as they may not have the resources on reserve to purchase or produce more inventory until they've received their payout. In another example, drivers for ride service hailing companies such as Uber may not get paid for the ride services they provide until a later time because of the amount of time it takes to process payment made by the rider.

Dependency on fast payouts notwithstanding, consumers nowadays simply demand that they receive their payouts as immediately, i.e., as close in time to the consummation of a transaction, as possible. As such, there's a need for a platform that can reduce the latency of payouts to as near real-time as possible.

SUMMARY

According to various aspects of the subject technology, a system for implementing fast payouts is described. A request to execute a payout to a payee account is received, where the request includes information about the payout. At least one payment rail available for the requested payout is determined from a plurality of payment rails based on the included information. Rules associated with each of the at least one payment rail are identified. A fastest payment rail is determined from the at least one payment rail for executing the payout based on the identified rules and the information about the payout. The payout is then executed over the determined fastest payment rail.

According to various aspects of the subject technology, a method for implementing fast payouts is described. A request to execute a payout to a payee account is received, where the request includes information about the payout. At least one payment rail available for the requested payout is determined from a plurality of payment rails based on the included information. Rules associated with each of the at least one payment rail are identified. A fastest payment rail is determined from the at least one payment rail for executing the payout based on the identified rules and the information about the payout. The payout is then executed over the determined fastest payment rail.

According to various aspects of the subject technology, a non-transitory machine-readable medium having stored thereon machine-readable instructions executable for implementing fast payouts is described. A request to execute a payout of funds from a source account in a first country and a first currency to a destination account in a second country and a second currency is received. A receipt of the funds from a payor account at a first funding agency in the first country and first currency determined in response to the receipt of the funds at the first funding agency, a disbursement of the funds to a payee account at a second funding agency in the second country and the second currency is caused. After the disbursement of the funds to the payee account is caused, an amount equal to the funds received from the payor from the first funding agency is transferred to the second funding agency.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Since the advent of ecommerce, many different forms of electronic payment options have been introduced. In order to enable these payment options, certain payment rails have had to be developed or adapted to handle the transactions. Consequently, multiple different payment rails exist today on which large volumes of funds are transacted at a variety of speed.

Some traditional rails, such as automated clearing house (ACH), which is used to handle credit and debit transactions, utilize a clearinghouse as an intermediary between payor and payee financial institutions. Funds are moved at the end of a day and thus produce some amount of latency. Other rails, such as Fedwire, are available to process transfers in real-time; however, these rails may be geographically restricted (e.g., to a specific country) as well as restricted to specific financial institutions (e.g., certain banks that are part of a network). As such, cross-border transactions may not be executable over these rails.

In order to serve better serve the needs of customers (i.e., corporations and consumers alike), a solution for providing near real-time transactions utilizing a network of existing payment rails is proposed.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
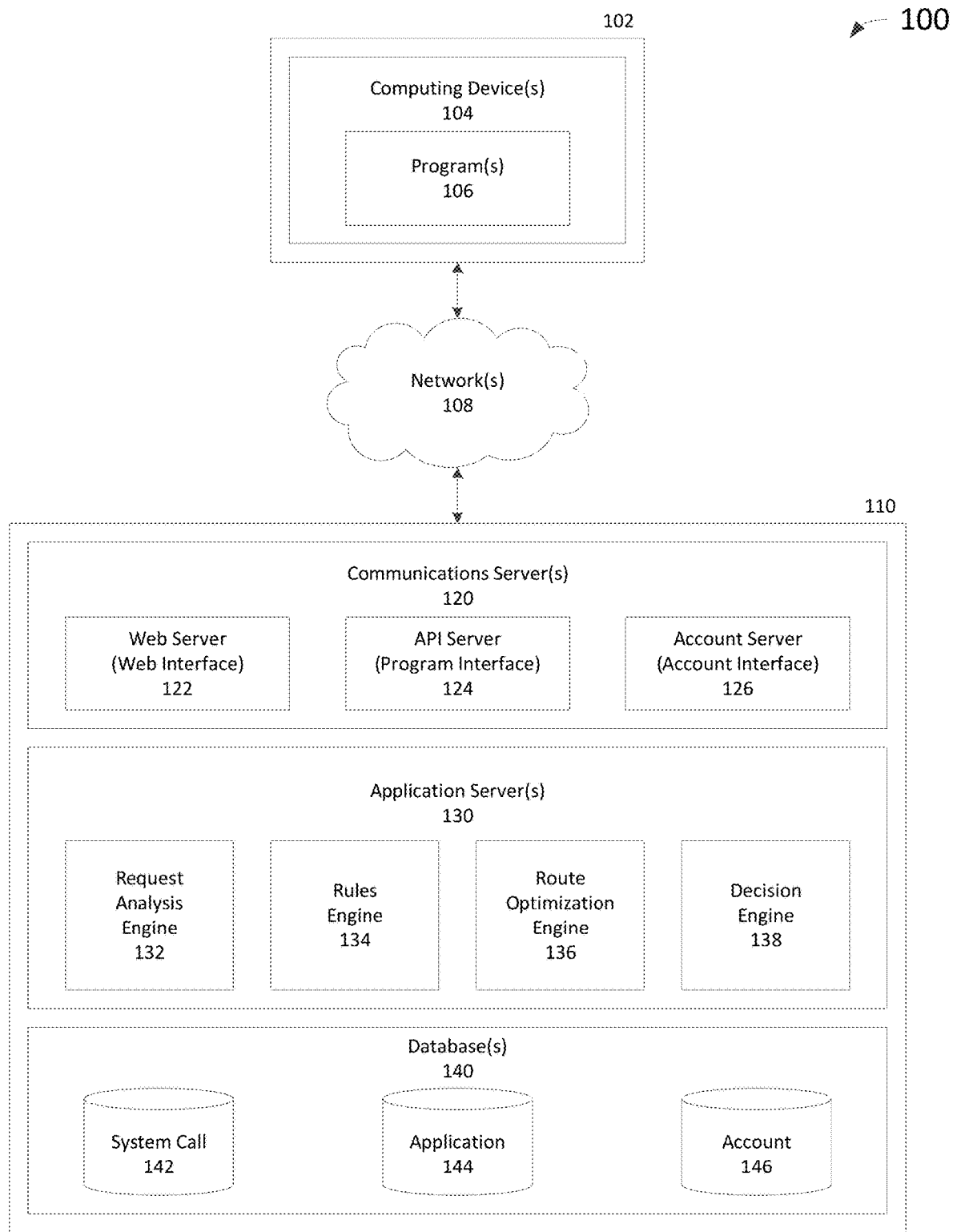
FIG. 1 is a block diagram of an exemplary computing system on which the implementation of fast payouts may be performed.

FIG. 1 is a block diagram of an exemplary computing system on which the implementation of fast payouts may be performed. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may also include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be servers that provide various services such as tools for verifying URLs based on information collected about customers. Application servers 130 may include multiple servers and/or components. For example, application servers 130 may include a request analysis engine 132, rules engine 134, route optimization engine 136, and/or decision engine 138. These servers and/or components, which may be in addition to other servers, may be structured and arranged to implement fast payouts.

Application servers 130, in turn, may be coupled to and capable of accessing one or more databases 140 including system call database 142, application database 144, and/or account database 146. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
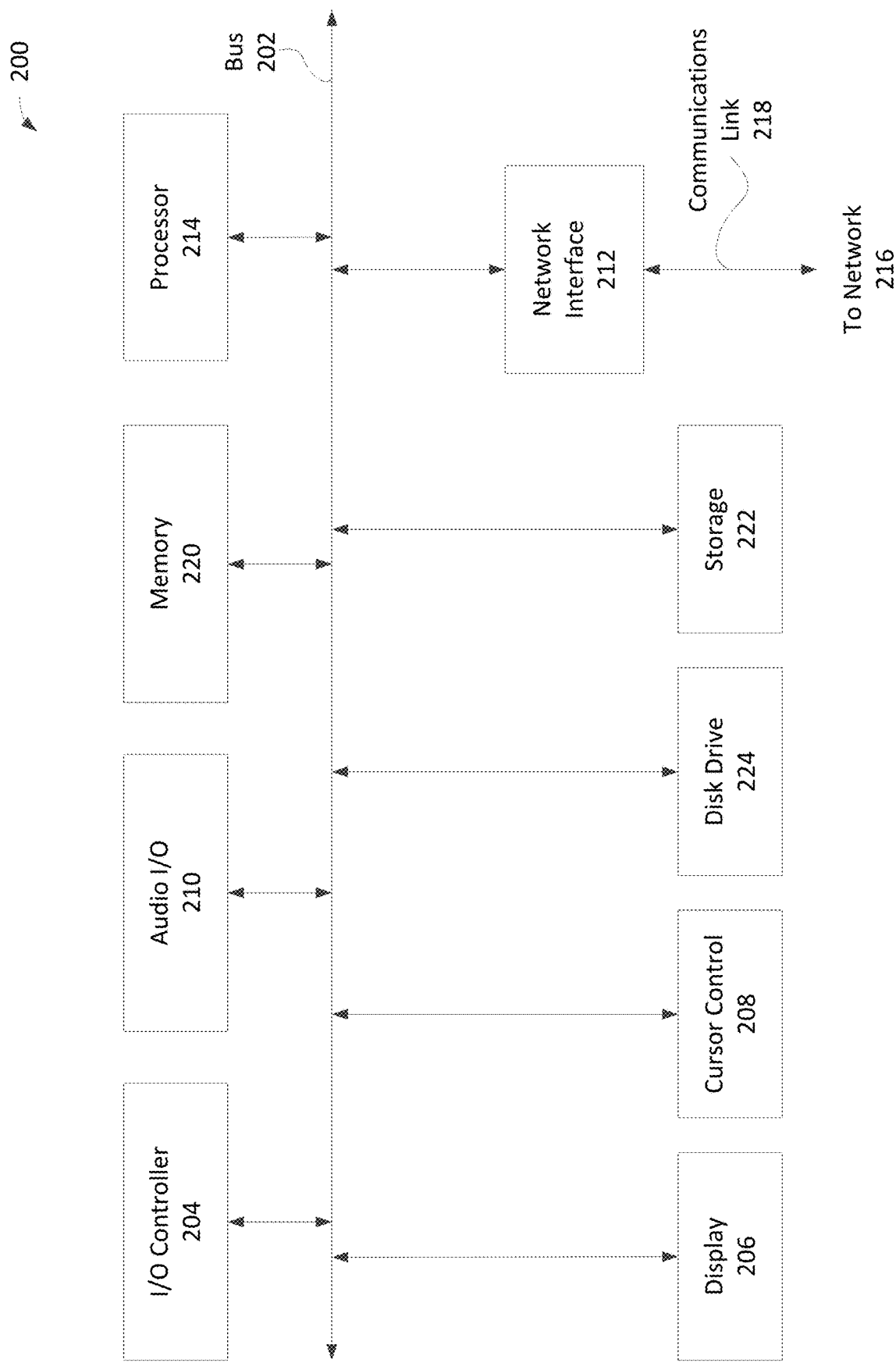
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanism for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
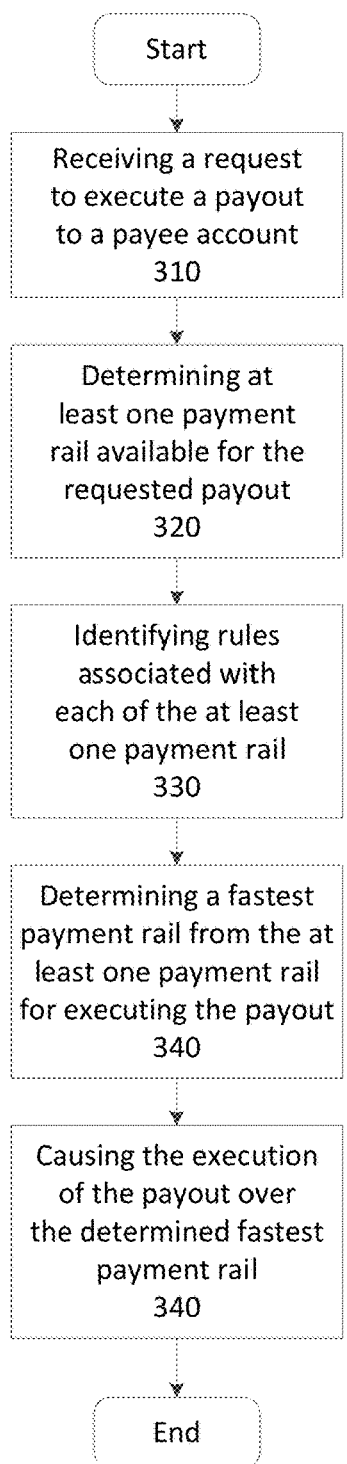
FIG. 3 illustrates an exemplary process 300 for implementing fast payouts.

FIG. 3 illustrates an exemplary process 300 for implementing faster payments. In step 310, a request to execute a payout to a payee account is received. The request may include information that provides details about the payout. For example, the information may include an identification of a destination financial institution, an account identification of the payee, an amount of the transfer, etc. The information may further include a destination country into which the transfer is to be made and a destination currency and a type of account.

In step 320, the system determines, from the plurality of payment rails, at least one payment rail available for the requested payout. This determination may be based on the information provided. For example, if the information associated with the request indicates that the money is to be paid out into an account in China, then a determination must be made to identify which payment rails (or which combination of payment rails) is capable of transferring the funds.

Each of the identified payment rails may have a set of rules that must be satisfied in order for the payout to be consummated. As such, in step 330, rules associated with each of the at least one real-time payment rail is identified. In some embodiments, the rules are routing rules. That is, the system identifies rules that specify how payments are to be initiated on a receiving rail through, for example, a bank partner. Rules may include, but are not limited to, maximum limits for cash payout without implicating know your customer (KYC), sanction screening, anti-money laundering screening, and anti-terrorism screening. In other words, the rules may be risk-based rules use to prevent the transfer of money for potential illicit purposes.

In some embodiments, the rules may provide an indication of what connections, format, and/or specification must be used to communicate with the system. The rules may also provide an indication of costs and fees for using an associated account or rails. The system may take this fee information and pass it back to one of the payor or payee to determine if the payor or payee is willing to pay the fee in order to engage in a faster transaction.

The rules may also include a routing table that provides information about how a payment can be routed. Returning to the example of China as the destination for the payout, the routing table may provide different path suggestions depending on how much and what information is available for the payee. If the payee has a Chinese bank account, and all the necessary information is known to the system, then a real-time payout may be executed to that payee via the Chinese bank account. If the payee doesn't hold such a bank account, the payee would be required to sign up for an account to receive the instant transfer through rails used by the bank. The sign-up process, however, creates friction and is, in itself, the delay from receiving funds in a real-time manner. As such, the routing table may suggest the next best path (i.e., one that doesn't require the user to sign up for a bank account).

In step 340, a fastest payment rail is determined from the at least one payment rail for executing the payout. The determination is based on the identified rules and the information about the payout. The system basically identifies the payment rail that can payout in the fastest manner while presenting the least amount of friction (e.g., requiring payee registration, KYC verification, authorization, authentication, etc.). Once the fastest payment rail is identified, the payout is caused to be executed over the determined fastest payment rail in step 350.

In an alternative embodiment, the payment processor that operates the system may maintain a repository of payment information for parties that transact funds through the system. In other words, account information for users may be maintained in the database and used to identify where a user holds accounts. This information may be useful in determining the most efficient of all viable paths for sending money from a source to a destination. Specifically, the routing table may provide an indication of the most efficient path based on the available accounts. The payment processor may thus centralize this information and serve as a repository for identifying all the institutions that a user is verified for and from which the user can send and receive money.

For example, if a user has an account with a mobile wallet in Asia (e.g., Alipay, WeChat, etc.), the system could affect real-time payout to that user in China through that mobile wallet. In order for the system to know which wallets the user is enrolled in, however, the system must maintain a database of such information on which it can rely. Coupled with the routing table, the system may be able to properly route the transaction based on the knowledge of where the user maintains accounts. The "last-mile delivery" of funds is the most crucial segment of the payment chain. Thus, by being able to engage with the user's destination account, the system could more easily effectuate a near real-time transfer.

In some embodiments, the system may identify the existing capabilities of an intermediary processor in order to orchestrate the payout. In some instances, there are transaction limits placed on payment transfers. For example, if a transaction limit of $250,000 is put on real-time transfers, then large volume business-to-business transaction may not be possible. As such, the system may downgrade the transaction to a slower rail. The system is able to accomplish this by reviewing the rules that are applicable to a transaction, and if certain rules can't be satisfied, the system determines alternative routes/channels for the transaction. Alternatively, the system may break the payout into several transactions so that none of the transactions exceeds the limit. The system will then execute the multiple transactions in order to transfer the total amount.

In some embodiments, from processing standpoint, partners require batch files to be submitted to them for payment processing because the partners don't have real-time API capabilities. In those cases, the system maintains a record of how many time files need to be submitted to the partners, and how many times the partners submit files out to clearinghouse systems. The system may then schedule the dissemination of the batch files to optimize the process. For example, the system may want to submit as close to cut-off time as possible so that the latest transactions can be included in that day's submission by the partner to the clearinghouse systems.

In some embodiments, while the rail may provide for real-time transactions, the rail may not have the ability to send additional data beyond the payment to the recipient. For example, SWIFT provides for real-time transfers in China; however, one shortcoming of SWIFT is its inability transfer remittance data for the transaction. As such, the funds may show up in an expedited fashion, but the recipient may not know what to do with those funds, or how to apply those funds, as remittance data is omitted. Typically, the faster payment system rails are designed for domestic delivery and have very limited field. Thus, those rails may not be capable of sending remittance data (e.g., name, address, amount, and other data that may be used to attribute payment). To solve this issue, the system may integrate with the domestic fund transfer rail capabilities and coordinate payment with communication about the payment via email or report.

Figure 4:
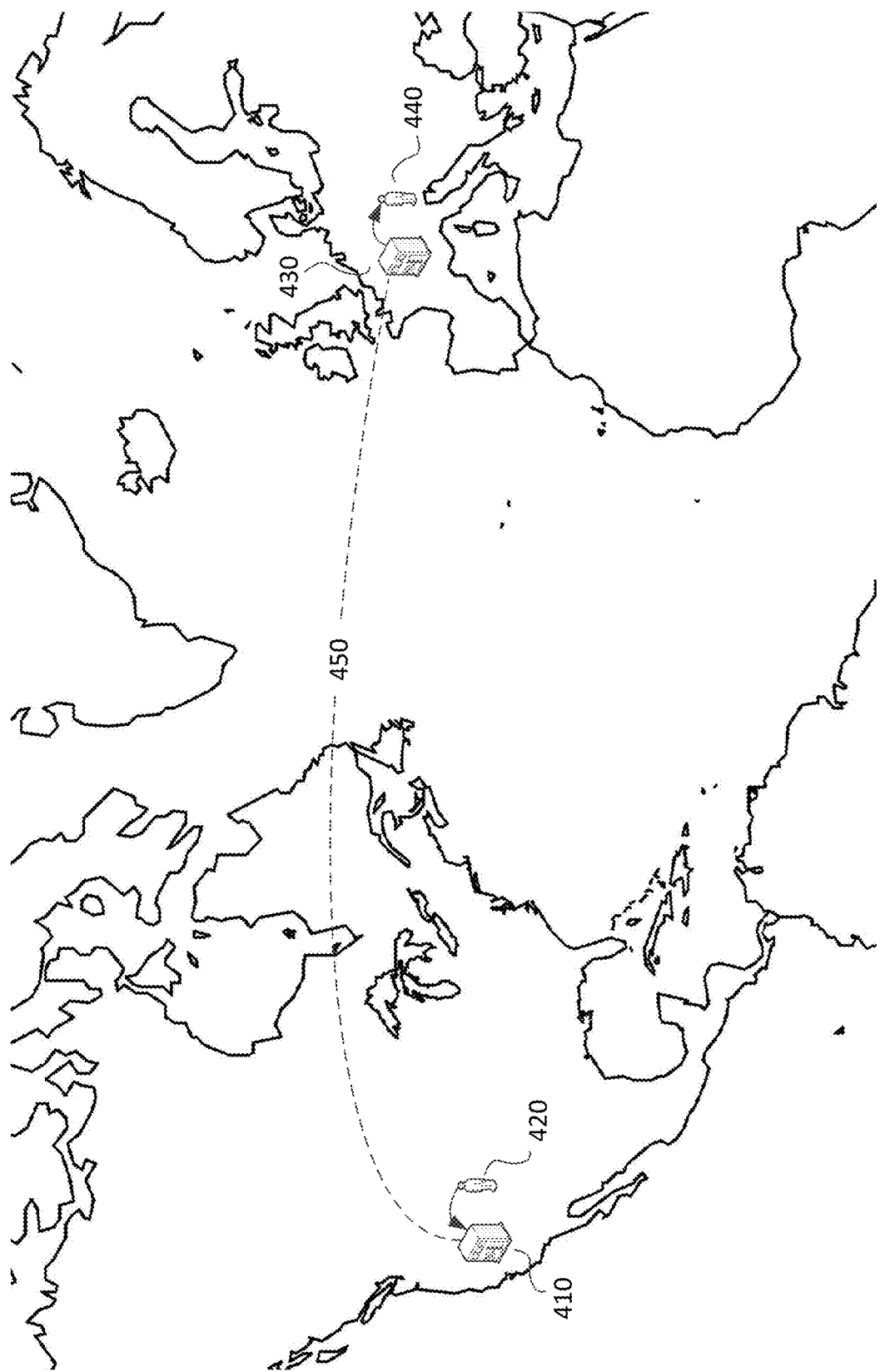
FIG. 4 provides a simple illustration of a network of funding agencies used to perform fast payouts.

In some embodiments, an international network of funding agencies may be implemented to execute cross-border fund transfers in near real-time. FIG. 4 provides an illustration of this network of funding agencies. In this example, a payor in the U.S. with a funding source in U.S. dollars (USD) wishes to send funds in Euros to a payee in France. Typical cross-border transactions that involve foreign exchanges require a 1-2 day settlement period. However, utilizing the proposed network of funding agencies, the source amount in USD may be taken in by the U.S. funding agency 410 from a payor 420. Once the funds are received in the U.S., a corresponding fund in Euros may be released from a prefunded account by the European counterpart 430 in France to the payee 440 right away. In other words, the payee will not have to wait for market to settle before receiving the full amount. The decoupled nature of this proposed platform permits such a transaction because all accounts are prefunded with local currency. In this particular instance, the collected USD are subsequently moved 450 into the European account as Euros to minimize exposure to foreign exchange fluctuation.

Alternatively, this proposed network could be created by opening an account in every major financial institution across the globe. The system may then orchestrate account-to-account transfers to move money in near real-time. As discussed above, so long as there's a communication line open between all the networked accounts, once money is transferred into one account, it may be immediately transferred out of another account to consummate the transaction.

In some embodiments, the system will predict a trend as to where money might be coming and going. This prediction will allow the system to ensure that adequate funds are available to be cashed out at the destination funding agency. For example, if a trend is established that during certain national holidays, that funds have shown a pattern of being sent from one country to another, the system may anticipate this phenomenon each calendar year and adjust its treasury to accommodate.

In some embodiments, a fee may be charged for an expedited fund transfer. For example, a pricing structure may be set where certain methods use to transfer funds will cost a certain amount in fees. That is, the quicker the fund is requested to be transferred, the higher the fee may be. All the associated fees may be presented to the payor and/or payee, and if either or both decides to pick up on one of the fees, then the transfer method corresponding to the fee will be used.

In some embodiments, the fees may be determined on a dynamic basis. For example, if an efficiency of scale (e.g., volume discount) is available somewhere within the network of financial institutions that are intermediaries in the transactions, then the pricing of the fees may be adjusted to reflect as much. For instance, if the system has already engaged in a number of fast payout transactions and is short of obtaining a volume discount, the system may lower the fee for fast payout to encourage additional participation. The net result of such lowering of fees may be enough additional requests that a volume discount is achieved.

In some embodiments, a wide range of payee endpoints may be available for payouts. In such instances, the system may pick the fastest payment endpoint that has been approved by a user. For example, the user may authorize payout in credit with a particular vendor (e.g., Uber cash). Two notable benefits may result from a payout into an account like an Uber cash account. First, there may be less regulations associated with such a payout. Simply said, this transaction is not considered a cash transaction. Second, Uber, or any other merchant, may offer a discount (e.g., 3% discount for funds loaded into a user's Uber cash account). This discount may be captured by the payment processor, passed along to the user, or shared.

In some embodiments, the system identifies where potential holdups in payouts are. Such holdups may be the result of underlying compliance that must be performed before real-time delivery may be executed. For example, in some cases, a payment partner in a foreign country may require identification verification because of government regulations. These points of latency may be identified when the system attempts to pay out funds through one of these channels, whether they're test or actual attempts, and the attempt is met with a request for additional information. Such information maybe be incorporated with the routing map describe above so that the fastest payment endpoint may be identified and utilized in subsequent transfers.

The points of latency may, in some embodiments, be identified as areas where the system may implement alternative payout methods. For example, a particular country having many points of latency because of government regulation requirements may be an optimal location for a funding agency to be added. As described above, a network of funding agencies may be implemented to execute cross-border fund transfers in near real-time. When funds are received at one end (i.e., in one country), funds may be released at another end (i.e., in another country) from a prefunded account in a funding agency established in that country. The transaction may then be executed in near real-time, as long as the payor and/or payee has an account with the system.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for implementing a fast payment comprising:
    a non-transitory memory storing instructions; and
    one or more hardware processors coupled to the non-transitory memory and configured to read the instructions from the non-transitory memory to cause the system to perform operations comprising:
        receiving a request to execute a payout to a payee account, the request including information about the payout;
        determining, from a plurality of payment rails based on the included information, at least one payment rail available for the payout;
        identifying rules associated with each of the at least one payment rail;
        automatically selecting, based on the identified rules and the information about the payout, a payment rail from the at least one payment rail for executing the payout;
        identifying, based on the information about the payout, a network of a plurality of intermediary nodes for the payout including a source node corresponding to the payee account and a destination node corresponding to a destination location of the payout;
        executing a test payout for the payout via the automatically selected payment rail and the identified network;
        adding, based on one or more points of latency identified during execution of the test payout, an intermediary node to the network of intermediary nodes; and
        executing the payout over the automatically selected payment rail and via the network of intermediary nodes including the added intermediary node.

2. The system of claim 1, wherein the information about the payout includes at least one of an identification of a destination financial institution, an account identification of a payee, an amount of the payout, a destination country of the payout, and a destination currency.

3. The system of claim 1, wherein the plurality of payment rails includes real-time payment rails and non-real-time payment rails.

4. The system of claim 1, wherein the rules include routing rules that specify how payments are to be initiated through a bank partner.

5. The system of claim 4, wherein the routing rules further provide an indication of at least one of appropriate connections, formats and specifications to be used to communicate with the bank partner.

6. The system of claim 1, wherein the rules include at least one of a maximum payout limit without implicating know your customer, sanction screening, anti-money laundering screening, and anti-terrorism screening.

7. The system of claim 1, wherein the operations further comprise:
    determining a fee for the payout associated with the automatically selected payment rail; and
    passing the automatically selected payment rail and the fee back to a requestor of the payout for acceptance.

8. The system of claim 7, wherein the fee may be calculated dynamically based on at least one of requestor demand and an availability of volume discounts.

9. A method for implementing a fast payment comprising:
- receiving, by a server system, a request to execute a payout to a payee account over an application programming interface (API), the request including information about the payout;
- determining, by the server system using the API, at least one payment rail available for the payout based on the included information;
- identifying, by the server system, rules associated with each of the at least one payment rail;
- automatically selecting, by the server system based on the identified rules and the information about the payout, a payment rail from the at least one payment rail for executing the payout;
- identifying, by the server system based on the information about the payout, a network of a plurality of intermediary nodes for the payout including a source node corresponding to the payee account and a destination node corresponding to a destination location of the payout;
- executing, by the server system, a test payout for the payout via the automatically selected payment rail and the identified network;
- adding, by the server system based on one or more points of latency identified during execution of the test payout, an intermediary node to the network of intermediary nodes; and
- executing, by the server system, the payout over the automatically selected payment rail.

10. The method of claim 9, wherein the information about the payout includes at least one of an identification of a destination financial institution, an account identification of a payee, an amount of the payout, a destination country of the payout, and a destination currency.

11. The method of claim 9, wherein the rules include routing rules that specify how payments are to be initiated through a bank partner, and wherein the routing rules further provide an indication of at least one of appropriate connections, formats and specifications to be used to communicate with the bank partner.

12. The method of claim 9, wherein the rules include at least one of a maximum payout limit without implicating know your customer, sanction screening, anti-money laundering screening, and anti-terrorism screening.

13. The method of claim 9, further comprising:
- determining, by the server system, a fee for the payout associated with the automatically selected payment rail; and
- passing, by the server system, the automatically selected payment rail and the fee back to a requestor of the payout for acceptance.

14. The method of claim 13, wherein the fee may be calculated dynamically based on at least one of requestor demand and an availability of volume discounts.

15. A non-transitory computer-readable medium having stored thereon machine-readable instructions executable to cause a computing system to perform operations comprising:
- receiving a request to execute a payout to a payee account, the request including information about the payout;
- determining, from a plurality of payment rails based on the included information, at least one payment rail available for the payout;
- identifying rules associated with each of the at least one payment rail;
- automatically selecting, based on the identified rules and the information about the payout, a payment rail from the at least one payment rail for executing the payout;
- identifying, based on the information about the payout, a network of a plurality of intermediary funding agencies for the payout including a source node corresponding to the payee account and a destination node corresponding to a destination location of the payout;
- executing a test payout for the payout via the automatically selected payment rail and the identified network;
- adding, based on one or more points of latency identified during execution of the test payout, an intermediary funding agency to the network of intermediary funding agencies; and
- executing the payout over the automatically selected payment rail and via the network of intermediary funding agencies including the added intermediary funding agency.

16. The non-transitory computer-readable medium of claim 15, wherein the information about the payout includes at least one of an identification of a destination financial institution, an account identification of a payee, an amount of the payout, a destination country of the payout, and a destination currency.

17. The non-transitory computer-readable medium of claim 15, wherein the plurality of payment rails includes real-time payment rails and non-real-time payment rails.

18. The non-transitory computer-readable medium of claim 15, wherein the rules include routing rules that specify how payments are to be initiated through a bank partner.

19. The non-transitory computer-readable medium of claim 18, wherein the routing rules further provide an indication of at least one of appropriate connections, formats and specifications to be used to communicate with the bank partner.

20. The system of claim 1, wherein the payout is a cross-border payout, and wherein the intermediary nodes are intermediary funding agencies.

* * * * *